United States Patent [19]

Hellman, III

[11] Patent Number: 4,580,679

[45] Date of Patent: Apr. 8, 1986

[54] ROLLTOP DISKETTE CONTAINER

[76] Inventor: Nat Hellman, III, 339 N. Palm Dr. #302, Beverly Hills, Calif. 90210

[21] Appl. No.: 746,939

[22] Filed: Jun. 20, 1985

Related U.S. Application Data

[63] Continuation of Ser. No. 549,424, Nov. 7, 1983, abandoned.

[51] Int. Cl.$^4$ .................. B65D 85/00; B65D 85/48
[52] U.S. Cl. .................. 206/425; 220/350; 220/22; 206/449; 206/444
[58] Field of Search .................. 206/444, 449, 425; 220/350, 22, 21

[56] References Cited

U.S. PATENT DOCUMENTS

| | | | |
|---|---|---|---|
| 4,162,024 | 7/1979 | Shanley | 220/350 |
| 4,209,093 | 6/1980 | Soderland | 206/425 |

FOREIGN PATENT DOCUMENTS

80/01581  6/1982  PCT Int'l Appl. .................. 206/425

*Primary Examiner*—Joseph Man-Fu Moy
*Attorney, Agent, or Firm*—Spensley Horn Jubas & Lubitz

[57] ABSTRACT

A rolltop diskette container which requires no more desk area when in the open position than it does when closed. The rolltop diskette container holds 100 of the 5¼ inch (133 millimeter) diskettes and requires approximately the same desk area as the conventional flip-top diskette container. The flip-top diskette container holds only 50 of the 5¼ inch (133 millimeter) diskettes.

The rolltop diskette container is comprised of two side panels 1 and 2, a bottom panel 3, and a rolltop 4. Partitions 6 and 7 may be utilized to index and separate the stored diskettes.

6 Claims, 11 Drawing Figures

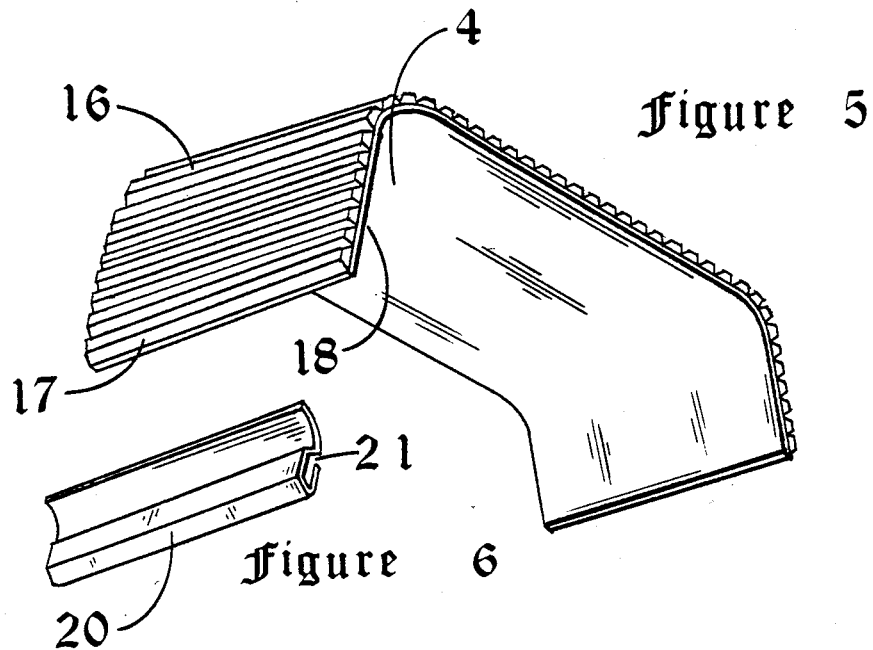
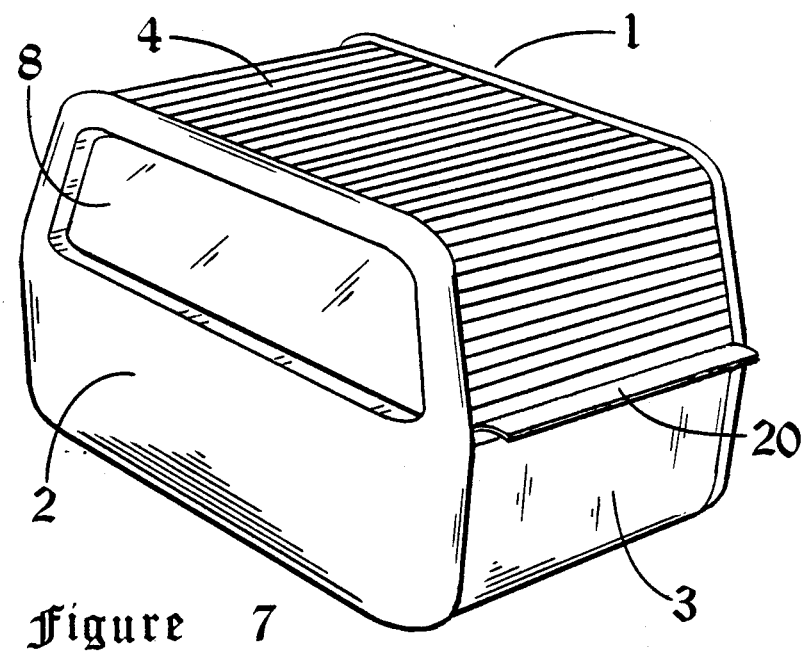

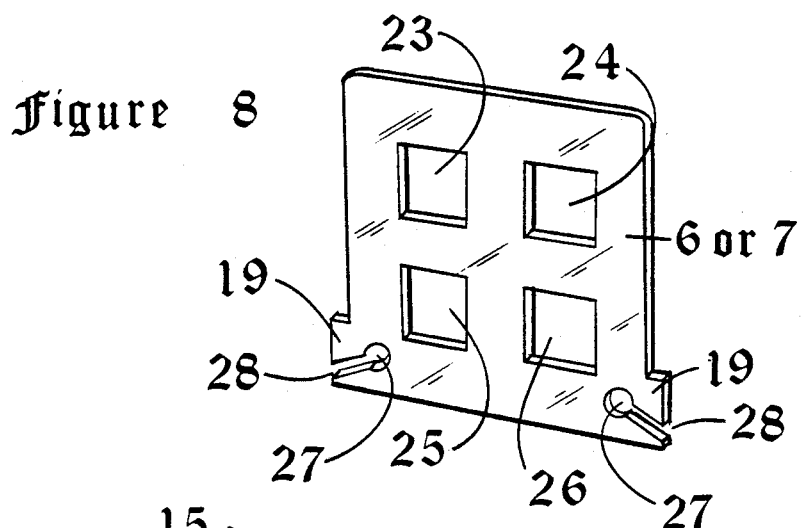
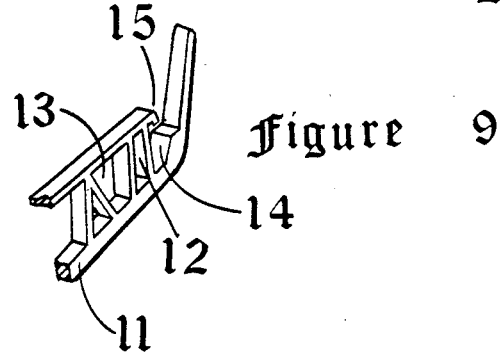
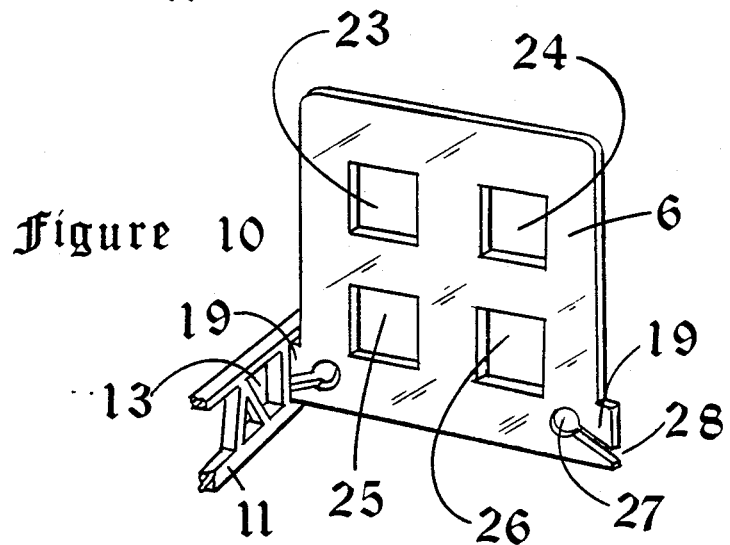

ROLLTOP DISKETTE CONTAINER

This application is a continuation of application Ser. No 549,424 filed 11-7-83 now abandoned.

TECHNICAL FIELD

This invention relates to an improvement in floppy diskette storage containers of the type commonly used to store the floppy diskettes which are used as information storage media for minicomputers and microcomputers. This invention relates more particularly to such a container utilizing rolltop construction.

BACKGROUND ART

Microcomputers commonly use 5¼ inch (133 millimeter) and 8 inch (203 millimeter) diskettes for storing information such as programs and data. These diskettes are also referred to as floppy disks, minifloppies, and simply disks.

The magnetic recording surfaces of diskettes are sensitive to contamination from airborne particles, surface dust, and fingerprints. The diskettes must not be bent, scratched, or physically abused. They must be kept away from magnetic fields such as those generated by telephones and electronic calculators.

Diskette storage containers, generally of flip-top construction, are well known. The flip-top diskette storage container typically holds 50 diskettes of the 5¼ inch (133 millimeter) size. The top of the container opens away from the user and pivots to the back of the container. In the open position the top is stored behind the container. Because of this the flip-top container requires more surface area on the desk when it is in the open position than it does when it is in the closed position.

Diskette storage containers may also be of removable top construction. The top is lifted from the container and either stored beneath the container or next to the container on the desk top.

DISCLOSURE OF INVENTION

An object of this invention is to provide a rolltop diskette container which requires no more desk area when in the open position than it does when closed.

Another object of this invention is to provide an improved diskette storage container which holds up to 100 of the 5¼ inch (133 millimeter) diskettes and which requires approximately the same desk space as do the conventional diskette storage containers which hold only 50 diskettes.

Another object of this invention is to provide an improved diskette storage container which permits easy access to all of the contained diskettes.

Yet another object of this invention is to provide an improved storage system that holds the diskettes in a vertical position when closed.

These objects are attained in a rolltop diskette container which utilizes rolltop construction to minimize container size and maximize its storage capability.

The rolltop of the improved storage container slides open in a manner similar to the way a rolltop desk opens. The rolltop slides toward the back of the container and then down the back side and underneath the container. A track is provided as an integral part of the side panels of the container to guide the rolltop. As the rolltop slides from the closed position to the open position it does not increase the amount of desk area taken up by the container.

Partitions inside the container create a plurality of sections into which diskettes may be sorted, thereby facilitating easy indexing and separating of the diskettes. The frontmost partition can be locked into the vertical position out of the path of the rolltop. This prevents the frontmost partition from tipping forward into the path of the rolltop as the rolltop is being closed and holds the diskettes in the vertical position so that they will not take a bend set after long storage.

BRIEF DESCRIPTION OF THE DRAWINGS

FIG. 5 is a perspective view of the rolltop.

FIG. 6 is a perspective view of the handle.

FIG. 7 is a perspective view of the rolltop diskette container with the rolltop closed as in FIG. 2 and with the handle secured to the rolltop.

FIG. 8 is a perspective view of a typical partition.

FIG. 9 is a fragmentary perspective view of an end of either of the slot assemblies.

FIG. 10 is a fragmentary perspective view showing the mating of the partition of FIG. 8 with the slot assembly of FIG. 9.

BEST MODE FOR CARRYING OUT THE INVENTION

Figure 1:
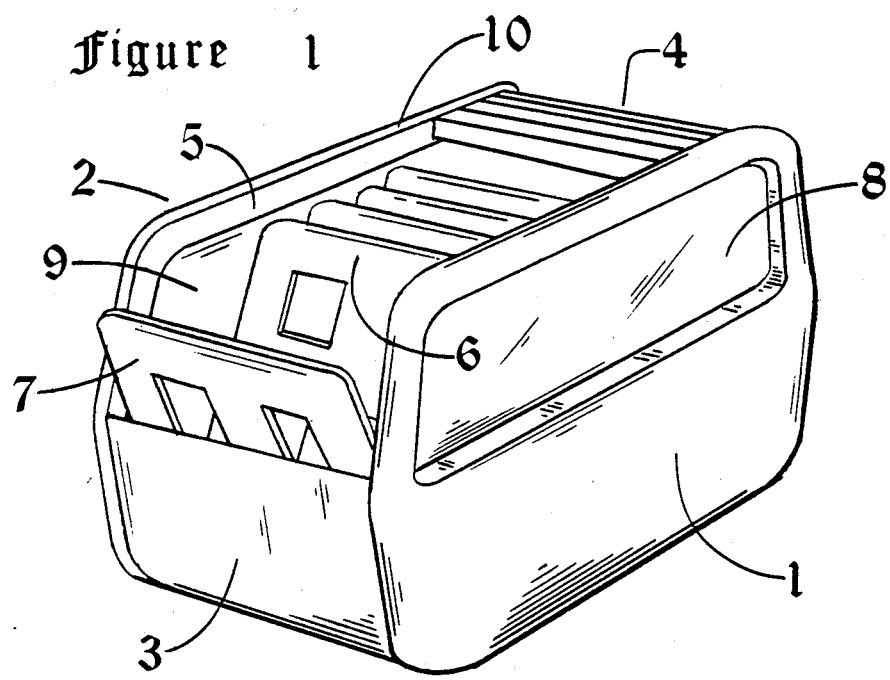
FIG. 1 is a perspective view of the rolltop diskette container with the rolltop open.

As can be seen in FIG. 1, two identical injection molded plastic side panels 1 and 2 are glued to an extruded plastic bottom panel 3. An tambour rolltop 4 slides in a track 5 in the side panels 1 and 2.

Typical partitions 6 and frontmost partition 7 inside the rolltop diskette container are provided to separate the diskettes according to the requirements of the user.

A recess 8 is provided in the side panels 1 and 2. On the inside of the rolltop diskette container the recess 8 forms a protrusion 9. The front, upper, and rear surfaces of the protrusions 9 of each side panel 1 and 2 form the inner portion of the upper half of the track 5. A lip 10 around the perimeter of the side panels 1 and 2 forms the outer surface of the track 5 around the entire perimeter of the side panels 1 and 2.

There is only enough clearance between the inner surface of the protrusions 9 and the partitions 6 and 7 to allow movement of the partitions within the rolltop diskette container. The protrusions 9 therefore prevent excessive side to side movement of the partitions 6 and 7 and any stored diskettes.

Figure 2:
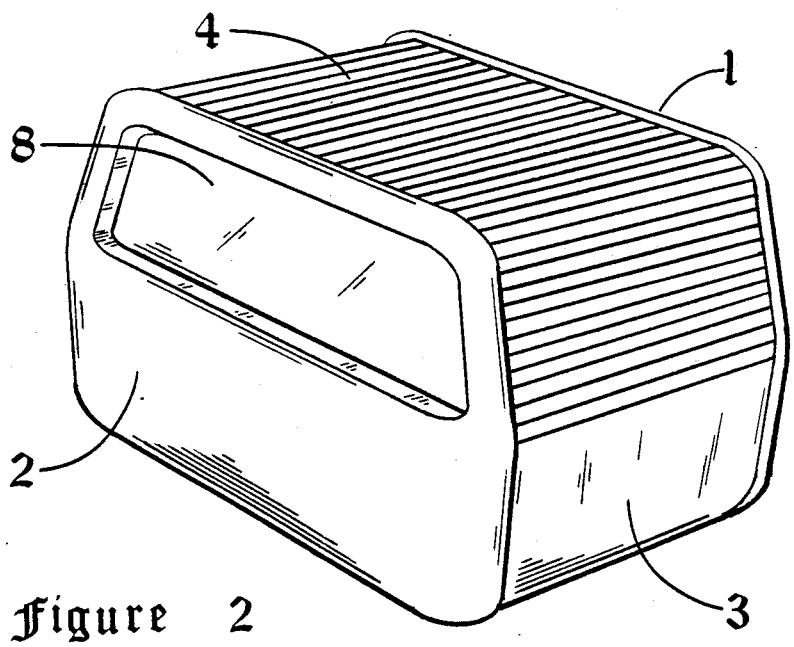
FIG. 2 is a perspective view of the rolltop diskette container with the rolltop closed.

FIG. 2 shows the rolltop diskette container with the rolltop 4 closed. The rolltop 4 is closed by pulling the rolltop 4 toward the front of the rolltop diskette container and then pulling the rolltop 4 down until the rolltop 4 touches the front end of the bottom panel 3.

Figure 3:
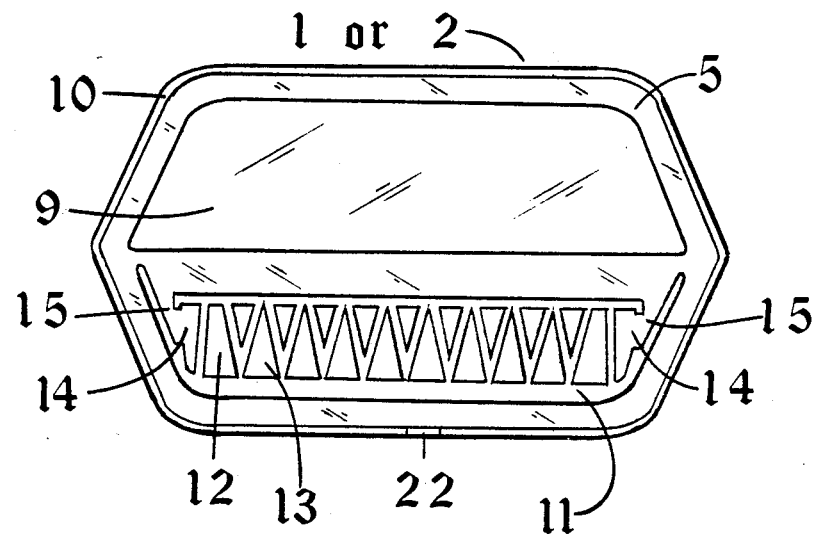
FIG. 3 is a side view of the inboard side of either of the side panels.

FIG. 3 shows the inboard side of either of the two side panels 1 and 2. The side panels are symmetrical about their vertical centerlines, thereby allowing any given panel to be used on either the right or left side of the rolltop diskette container.

As mentioned above, the lip 10 which forms the perimeter of the side panels 1 and 2 also forms the outer surface of the track 5 and the inner surface of the upper half of track 5 is formed by the front, upper, and rear surfaces of the protrusion 9. The inner surface of the lower half of the track 5 is formed by the front, lower and rear surfaces of the slot assembly 11.

Typical slots such as 12 and 13 are provided in the slot assembly 11 to moveably secure the partitions 6. An end slot 14 is provided in the ends of the slot assembly 11 to moveably secure the frontmost partition 7. Locking tabs 15 are provided in the end slots 14 to lock the partition 7 in the vertical position. The forwardmost partition 7 can be locked in the vertical position so that it will not be in the path of the rolltop 4 when the rolltop 4 is being closed. This also holds the diskettes in the vertical position during storage.

Figure 4:
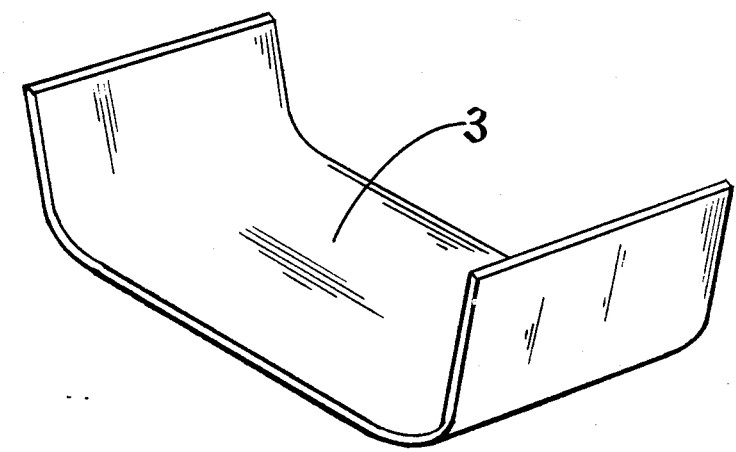
FIG. 4 is a perspective view of the bottom panel.

FIG. 4 shows the extruded plastic bottom panel 3 which is secured to the side panels 1 and 2 with glue.

FIG. 5 shows the rolltop 4 which has typical tambour slats 16 and frontmost tambour slat 17. A flexible membrane bottom 18 secures all of the slats 16 and 17 together.

FIG. 6 shows the handle 20. The frontmost slat 17 of the rolltop 4 is pressed into the groove 21 of the handle 20. The fit between the groove 21 of the handle 20 and the frontmost slat 17 of the rolltop 4 is tight enough to hold the handle in place. The handle 20 is further prevented from moving to either side by the side panels 1 and 2 as can be seen in FIG. 7. FIG. 7 shows the handle installed on the rolltop diskette container.

FIG. 8 shows a partition 6 or 7. Each partition 6 or 7 has at its lower edges a tab 19 and also has four windows 23, 24, 25, and 26.

The tabs 19 of each partition are secured moveably within the slots 12, 13, and 14 of the slot assembly 11 shown in FIG. 9. The locking tab 15 can be used to lock the frontmost partition 7 in the vertical position.

Each of the tabs 19 has a hole 27 and a slot 28 which allow the tabs 19 of the frontmost partition 6 to compress slightly when the tabs 19 engage their respective locking tabs 15.

FIG. 10 shows a typical partition 6 with its tab 19 secured moveably inside a typical slot 12. The top of the partition 6 is capable of moving toward the front and rear through a range of approximately 6 inches (15 centimeters) as the tab 19 pivots inside the slot 12.

Figure 11:
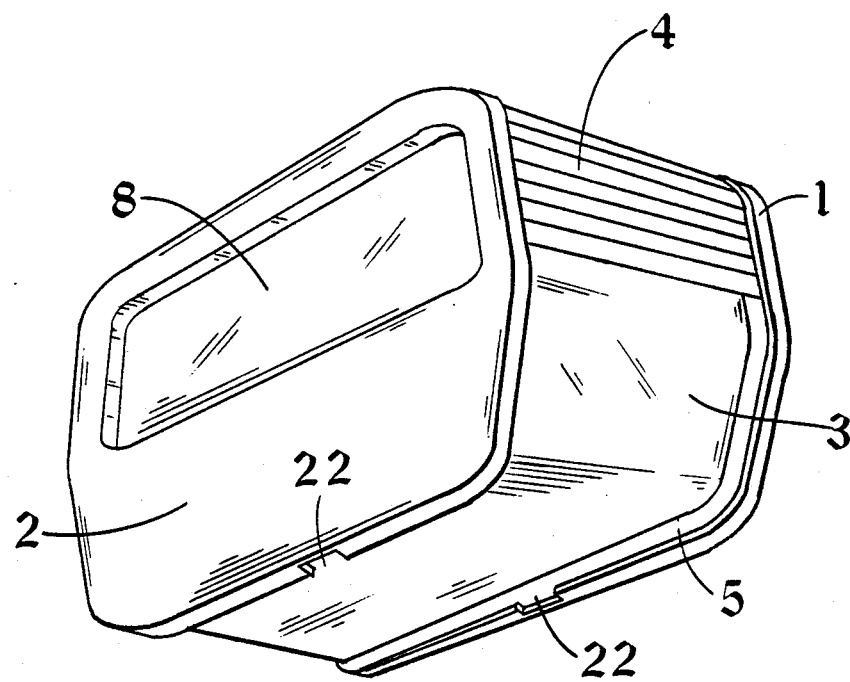
FIG. 11 is a perspective view of the rolltop diskette container showing the bottom of the container.

FIG. 11 shows the track slots 22 in the side panels 1 and 2. The rolltop 4 can be inserted into an assembled rolltop diskette container by inserting it into the track slots 22 and on into the tracks 5. The rolltop 4 can also be removed through the track slots 22 if it should need to be replaced.

I claim:
1. An improved rolltop container for storing diskettes, comprising:
   a. a rolltop member having slats secured to a flexible membrane bottom;
   b. two symetric molded side panels, each having a guide slot for movably securing the rolltop member, and an integral partition slot member having generally triangular integral stop elements, wherein the rolltop member is movably secured in the guide slots of the two side panels;
   c. an open sided bottom member, secured to each side panel; and
   d. a plurality of partitions having tabs for insertion into the partition slot member, thereby being movably secured between the stop elements.

2. The improved rolltop container of claim 1, further including a removal slot formed in the bottom portion of each guide slot through which the rolltop member may be inserted into or removed from the guide slots.

3. The improved rolltop container of claim 1, further including a locking tab integrally formed with the partition slot member.

4. The improved rolltop container of claim 1, wherein the partition tabs include a means for allowing the partition tabs to compress to allow the frontmost partition to be locked into the vertical position.

5. The improved rolltop container of claim 4, wherein the compression allowance means comprises a slot and hole arrangement.

6. An improved rolltop container for storing diskettes, comprising:
   a. a rolltop member having slats secured to a flexible membrane bottom;
   b. two symetric molded side panels, each having a guide slot for movably securing the rolltop member, a removal slot formed in the bottom portion of each guide slot through which the rolltop member may be inserted into or removed from the guide slots, and an integral partition slot member having generally triangular integral stop elements and a integral locking tab;
   c. an open sided bottom member, secured to each side panel;
   d. a plurality of partitions having tabs for insertion into the partition slot member, thereby being movably secured between the stop elements, and further including a slot and hole arrangement in each tab to allow the frontmost partition to be locked into the vertical position by the locking tab.

* * * * *